(12) United States Patent
Bryan et al.

(10) Patent No.: US 12,340,214 B2
(45) Date of Patent: *Jun. 24, 2025

(54) SYSTEM AND METHOD FOR AUTOMATED CROSS-APPLICATION DEPENDENCY MAPPING

(71) Applicant: GalaxE.Solutions, Inc., Somerset, NJ (US)

(72) Inventors: Timothy Bryan, Somerset, NJ (US); Dheeraj Misra, Somerset, NJ (US); Sandipan Gangopadhyay, Somerset, NJ (US)

(73) Assignee: GalaxE.Solutions, Inc., Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,271

(22) Filed: Aug. 21, 2023

(65) Prior Publication Data

US 2023/0393846 A1 Dec. 7, 2023

Related U.S. Application Data

(63) Continuation of application No. 15/087,768, filed on Mar. 31, 2016, now Pat. No. 11,734,000.

(Continued)

(51) Int. Cl.
 G06F 8/73 (2018.01)
 G06F 8/75 (2018.01)
(52) U.S. Cl.
 CPC . *G06F 8/73* (2013.01); *G06F 8/75* (2013.01)

(58) Field of Classification Search
 CPC .................................. G06F 8/75; G06F 8/73
 See application file for complete search history.

(56) References Cited

U.S. PATENT DOCUMENTS 5,826,256 A * 10/1998 Devanbu ................. G06F 8/30
6,615,199 B1 9/2003 Bowman-Amuah
(Continued)

OTHER PUBLICATIONS

PCT/US2016/025367, International Search Report (PCT/ISA/220 ancl PCT/ISA/210) dated Jun. 23, 2016, enclosing Written Opinion of the International Searching Authority (PCT/ISA/237) (Eleven (11) pages).

*Primary Examiner* — Lewis A Bullock, Jr.
*Assistant Examiner* — Theodore E Hebert
(74) *Attorney, Agent, or Firm* — Crowell & Moring LLP (57) ABSTRACT

A system and method for automatically generating cross-application dependency maps for enterprise IT environments is described. Automated code parsing techniques are used to identify dependencies between and among different business applications within the IT environment, including for both legacy and modern business applications. A thorough analysis of the enterprise-wide impact of a programming change, such as, for example, a change to the code of a legacy business application, can be conducted. There is the ability to perform canonical and customized searches of dependent elements between components of the IT environment and generate impact reports that can show how desired changes to particular applications may affect the environment. The impact of changes in a code repository, which can include documents in different programming languages that reside in a separate code environment, can be identified and analyzed.

19 Claims, 4 Drawing Sheets

Related U.S. Application Data (60) Provisional application No. 62/140,873, filed on Mar. 31, 2015.

(56) References Cited

U.S. PATENT DOCUMENTS

| | | | | |
|---|---|---|---|---|
| 7,155,664 | B1* | 12/2006 | Lee | G06F 8/73 |
| | | | | 717/123 |
| 9,134,976 | B1* | 9/2015 | Ezick | G06F 8/43 |
| 9,342,273 | B1* | 5/2016 | Kumar | G06F 8/433 |
| 9,405,906 | B1* | 8/2016 | Sheth | G06F 8/75 |
| 10,229,273 | B2* | 3/2019 | Sheth | G06F 8/75 |
| 11,449,356 | B2* | 9/2022 | Misra | G06F 11/3466 |
| 11,734,000 | B2* | 8/2023 | Bryan | G06F 8/75 |
| | | | | 717/123 |
| 2003/0056192 | A1* | 3/2003 | Burgess | G06F 8/75 |
| | | | | 717/100 |
| 2003/0084425 | A1* | 5/2003 | Glaser | G06F 8/71 |
| | | | | 717/124 |
| 2004/0046785 | A1* | 3/2004 | Keller | G06F 9/5061 |
| | | | | 715/734 |
| 2004/0049509 | A1* | 3/2004 | Keller | H04L 41/0893 |
| 2005/0204340 | A1* | 9/2005 | Ruminer | G06F 8/70 |
| | | | | 717/123 |
| 2006/0195559 | A1* | 8/2006 | Winter | G06F 8/60 |
| | | | | 709/223 |
| 2008/0294777 | A1* | 11/2008 | Karve | G06F 8/60 |
| | | | | 709/226 |
| 2008/0295065 | A1* | 11/2008 | Hawkins | G06F 8/75 |
| | | | | 717/103 |
| 2010/0037211 | A1* | 2/2010 | Zakonov | G06F 11/3604 |
| | | | | 717/130 |
| 2010/0070948 | A1* | 3/2010 | Rama | G06F 8/72 |
| | | | | 717/105 |
| 2011/0258611 | A1* | 10/2011 | Dutta | G06F 11/3612 |
| | | | | 717/127 |
| 2012/0260236 | A1* | 10/2012 | Basak | G06F 11/323 |
| | | | | 717/132 |
| 2013/0212565 | A1* | 8/2013 | Nishiyama | G06F 16/20 |
| | | | | 717/131 |
| 2014/0282373 | A1* | 9/2014 | Garza | G06F 8/51 |
| | | | | 717/106 |
| 2015/0020048 | A1* | 1/2015 | Misra | G06F 8/73 |
| | | | | 717/120 |
| 2015/0040108 | A1* | 2/2015 | Kushida | G06F 11/362 |
| | | | | 717/131 |
| 2015/0066163 | A1* | 3/2015 | Sunderam | G05B 17/02 |
| | | | | 700/29 |
| 2015/0089478 | A1* | 3/2015 | Cheluvaraju | G06F 8/72 |
| | | | | 717/123 |
| 2015/0363493 | A1* | 12/2015 | Laredo | G06F 16/2291 |
| | | | | 707/770 |
| 2016/0092211 | A1* | 3/2016 | Atanasiu | G06F 11/323 |
| | | | | 717/113 |
| 2016/0226722 | A1* | 8/2016 | Corcoran | H04L 67/63 |
| 2016/0283362 | A1* | 9/2016 | Seto | G06F 16/2455 |
| 2016/0299831 | A1* | 10/2016 | Cimadamore | G06F 8/75 |

\* cited by examiner

SYSTEM AND METHOD FOR AUTOMATED CROSS-APPLICATION DEPENDENCY MAPPING

CROSS REFERENCE TO RELATED APPLICATIONS

This application is a continuation of application Ser. No. 15/087,768, filed on Mar. 31, 2016, which claims the benefit of U.S. Provisional Application No. 62/140,873, filed Mar. 31, 2015, the entire contents of which are hereby incorporated by reference.

BACKGROUND ART

A typical enterprise IT environment is a combination of older legacy business applications and newer, more modern applications. With evolving business needs, the architectural complexity behind the integration scheme of legacy and modern business applications within the enterprise IT environment increases over time. Between legacy and modern applications, the legacy applications are typically considered more difficult to maintain, modify, or enhance because there is a general lack of understanding about the legacy application and its dependencies with other applications. For example, those individuals who were considered experts on the subject matter of the legacy application may no longer be available as a resource, whether by retirement or loss of knowledge and expertise over extended periods of time. The situation is worsened with a lack of accessible documentation concerning the operation and integration of the legacy application. For these reasons, a legacy business application can present challenges for those individuals who later join the business organization.

When a business application attains legacy status, there is typically hesitation to introduce a change to the legacy code. This hesitation is typically the result of a lack of available subject matter expertise that presents difficulties and challenges in, for example: (1) analyzing the impact on the enterprise IT environment due to a programming change; (2) assessing potential risks posed by a programming change; (3) sizing the change and regression impact; (4) identifying those project stakeholders who may be impacted by a change; (5) planning the regression test; (6) designing the change optimally; and (7) delivering the change quickly and effectively to the business. Conversely, there is a constant need to change the legacy code because of ever-evolving business needs that must be addressed.

If not addressed, these challenges can lead to ineffective IT solutions that force a design that works around making changes to a legacy application. Eventually, this can lead the enterprise to an institutional mindset of delaying any modernization initiatives.

In order to overcome the above challenges and to efficiently and effectively analyze the impact on an enterprise IT system due to a programming change to a legacy business application, the enterprise should be able to easily and quickly identify cross dependencies among applications (both new and legacy) and across the applications' corresponding technology and architectural tiers.

While it is known that the cross-dependency maps are crucial for this type of analysis, it is a complex, time-consuming, and expensive task for the enterprise to generate a useful cross-dependency map from application source code automatically and on-demand. Typically, cross-tier analysis is performed manually, which is time-consuming and prone to error.

Prior methods of generating cross-dependency maps are infrastructure centric and not application centric. There are agent-based or agentless techniques available that probe or detect activities in the server infrastructure, but these techniques do not help perform an analysis of the larger impact resulting from a change to a software application. In addition, the prior methods can only identify hierarchy within a technology tier, which forces a cross-tier analysis to be performed manually. These prior methods are targeted for modern applications, but not for the practical enterprise with an IT environment that includes disparate legacy and modern business applications.

In that regard, a system and method for automatically generating cross-application dependency maps for enterprise IT environments, for example, is needed.

SUMMARY OF THE INVENTION

In one aspect of the disclosure, a system for automating cross-application dependency mapping of an information technology (IT) environment is provided. The system may include a non-transitory computer readable medium storing executable instructions, the executable instructions when executed by at least one computing device causes the at least one computing device to: receive a source file associated with at least one configuration file specified by a user, parse the source file by looping through each line in the source file in order to obtain parsed information, analyze a call hierarchy of each service operation based at least in part on the parsed information from the source file, and generate a call hierarchy report based on the analyzed call hierarchy.

In another aspect of the disclosure, a computer-implemented method for automating cross-application dependency mapping of an information technology (IT) environment is provided. The method may include the acts of: receiving a source file associated with at least one configuration file specified by a user, parsing the source file by looping through each line in the source file in order to obtain parsed information, analyzing a call hierarchy of each service operation based at least in part on the parsed information from the source file, and generating a call hierarchy report based on the analyzed call hierarchy.

In a further aspect of the disclosure, a non-transitory computer readable medium storing executable instructions is provided. The executable instructions when executed by at least one computing device causes the at least one computing device to perform a method for automating cross-application dependency mapping of an information technology (IT) environment. The method may include the acts of: receiving a source file associated with at least one configuration file specified by a user, parsing the source file by looping through each line in the source file in order to obtain parsed information, analyzing a call hierarchy of each service operation based at least in part on the parsed information from the source file, and generating a call hierarchy report based on the analyzed call hierarchy.

Other objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

DETAILED DESCRIPTION OF EMBODIMENTS OF THE INVENTION

The disclosure is directed to enterprise information technology (IT) environments, and more particularly to more efficient management of such enterprise IT environments through automated cross-application dependency mapping.

A system and method for automatically generating cross-application dependency maps for enterprise IT environments is described herein. Automated code parsing techniques, for example, are used to identify dependencies between and among different business applications within the IT environment, including for both legacy and modern business applications. A thorough analysis of the enterprise-wide impact of a programming change, such as, for example, a change to the code of a legacy business application, can be conducted. In one aspect, there is the ability to perform canonical and customized searches of dependent elements between components of the IT environment and generate impact reports that can show how desired changes to particular applications may affect the environment.

The impact of changes in a code repository, which may include documents in different programming languages that reside in a separate code environment, may be identified and analyzed. Integration with quality assurance tools and software, such as McCabe, is possible to generate test cases and provide objective data on code coverage. To that end, manual identification of cross-application dependencies and interpretation of data, for instance, may be eliminated.

The present disclosure provides a number of benefits and/or advantages over prior methods of generating cross-dependency maps. For example, complex and complete bottom-up parsing and analysis of the code base, including all legacy and modern business applications that are part of the larger enterprise IT environment, is available which may help eliminate the draw-backs of a top-down approach to mapping, such as the failure to identify many critical elements and dependencies of the applications in an IT environment. There is end-to-end traceability and the ability to perform scenario-based simulations of changes to the code base to identify how changes to the code of legacy and/or modern business applications will impact the overall enterprise IT environment. In that regard, automated generation of cross-application dependency maps may be used to search for and identify impacted high-level use cases, transaction and screen flows, code, data elements, files, and other technical assets across the enterprise IT environment.

An additional benefit and/or advantage, for example, may be that automated dependency mapping will assist in prioritizing application deliverables and minimize or even eliminate unintentional impact to the enterprise IT environment. Targeted complexity and risk analysis allows for efficiency and timeliness of key decision-making that impacts the overall enterprise on a daily basis. Impact assessment may drive and enhance the comprehensiveness of enterprise environment requirements and design, and provide guidance for targeted regression analysis and test and code coverage metrics, including an assessment of the risk associated with any proposed change to one or more components of the enterprise IT environment. Test cases may be automatically generated and require only subject matter expert (SME) validation.

A further additional benefit and/or advantage, for example, is that integration may be possible with a variety of tools, including MULE ESB (with an available ID Auto Code Generation enhancement), and automatic identification is capable for dead code, obsolete functions, sequence flow, and data points that may be used to establish caller and callee identity. The described automated cross-application dependency mapping may provide efficiency gains of up to eighty percent over traditional manual-based methods.

While the invention may be used in connection with C, C++, VB6, .Net suite, Java/J2EE, Cobol, DCLGEN, JCL, PL/SQL, and Oracle Forms, it should be appreciated that the invention may be equally applicable to other known or future programming languages as well.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment.

Furthermore, the particular features, structures, or characteristics may be combined in any suitable manner on one or more embodiments without limitation. The term "or" as used herein is to be interpreted as inclusive or meaning any one or any combination.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention.

However, it should be appreciated that the invention may be practiced without such specific details. Additionally, for brevity sake well-known methods, procedures, components, and circuits have not been described in detail.

Figure 1:
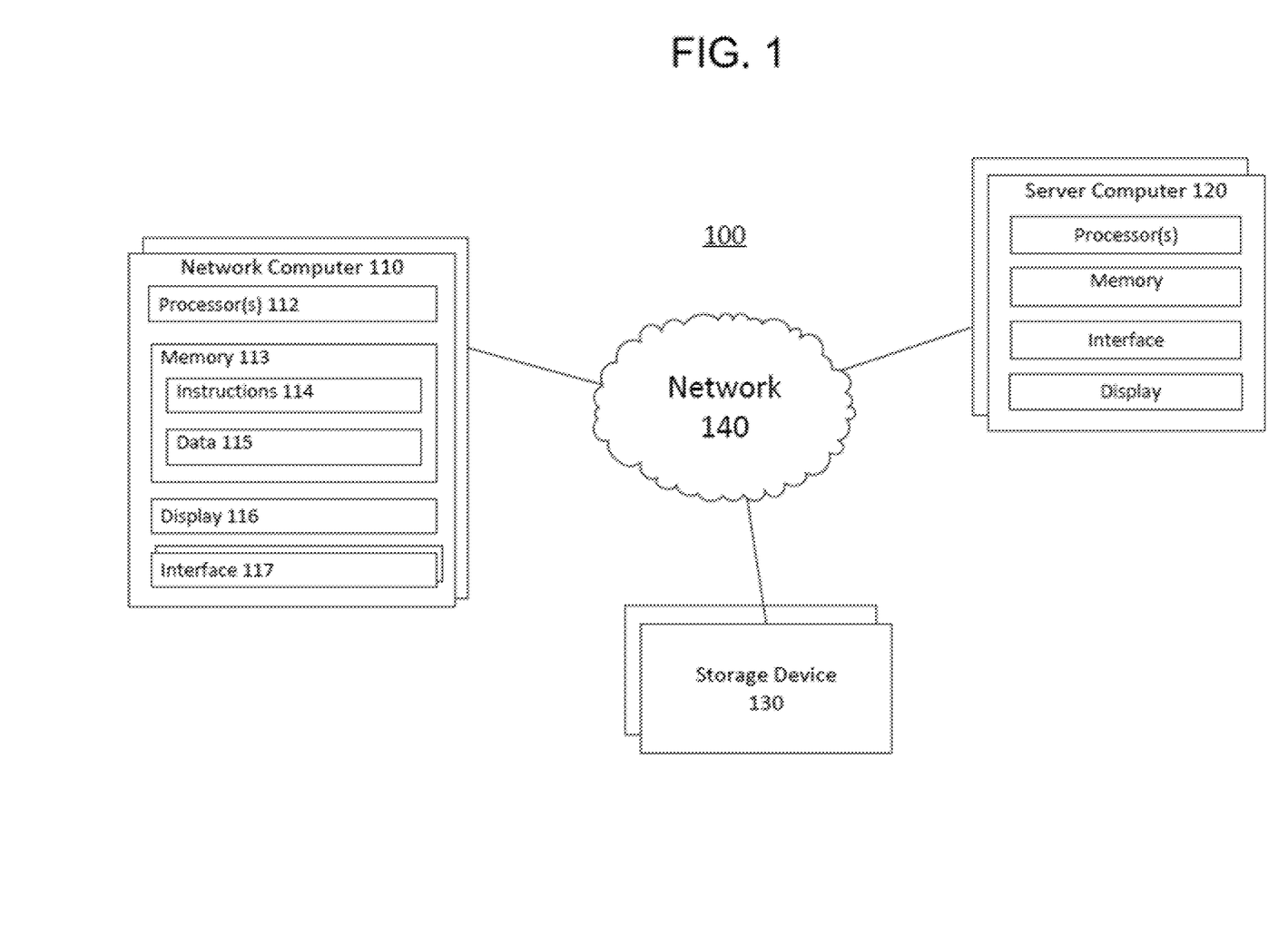
FIG. 1 illustrates an example system in accordance with one or more aspects of the disclosure.

FIG. 1 illustrates an example system 100 in accordance with one or more aspects of the disclosure. For instance, system 100 may represent at least a portion of an IT environment. System 100 may include a plurality of computers and/or computing devices, such as, network computer 110, server computer 120, and storage device 130. By way of example only, network computer 110 is connected to network 140 and may include different types of components associated with a computer, such as one or more processors 112, memory 113, instructions 114, data 115, display 116, and an interface 117. The network computer 110 may be mobile (e.g., laptop computer, tablet computer, smartphone, PDA, etc.) or stationary (e.g., desktop computer, etc.). Similarly, server computer 120 may also include one or more processors, memory, interface, and/or display and may be configured to communicate with other computer devices on network 140.

The processor 112 of network computer 110 may instruct the components thereof to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores at least instructions 114 and/or data 115 that can be accessed by processor 112. For example, memory 113 may be hardware capable of storing information accessible by the processor, such as a ROM, RAM, hard-drive, CD-ROM, DVD, write-capable, read-only, etc. The set of instructions may be included in software that can be implemented on the network computer 110 and should be noted that the terms "instructions," "steps," "algorithm," and "programs" may be used interchangeably. Data 115 can be retrieved, manipulated or stored by the processor 112 in accordance with the set of instructions 114 or other sets of executable instructions. The data 115 may be stored as a collection of data.

The display 116 may be any type of device capable of communicating data to a user, such as a liquid-crystal display ("LCD") screen, a plasma screen, etc. Interface 117 allow a user to communicate with the network computer 110 and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer 120 (and additional server computers) may be rack mounted on a network equipment rack and/or located, for instance, in a data center. In one example, the server computer 120 may use the network 140 to serve the requests of programs executed on network computer 110 and/or storage device 130.

The storage device 130 illustrated in FIG. 1 may be configured to store large quantities of data and/or information. For example, the storage device 130 may be a collection of storage components, or a mixed collection of storage components, such as ROM, RAM, hard-drives, solid-state drives, removable drives, network storage, virtual memory, cache, registers, etc. The storage device 130 may also be configured so that the network computer 110 and/or server computer 120 may access it via the network 140.

The network 140 may be any type of network, wired or wireless, configured to facilitate the communication and transmission of data, instructions, etc. from one component to another component of the network. For example, the network 140 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the network configuration illustrated in FIG. 1 serves only as an example and is thus not limited thereto. System 100, for instance, may include numerous other components connected to network 140, include more than one of each network component (as shown by the cascaded blocks), and network 140 may be connected to other networks.

Figure 2:
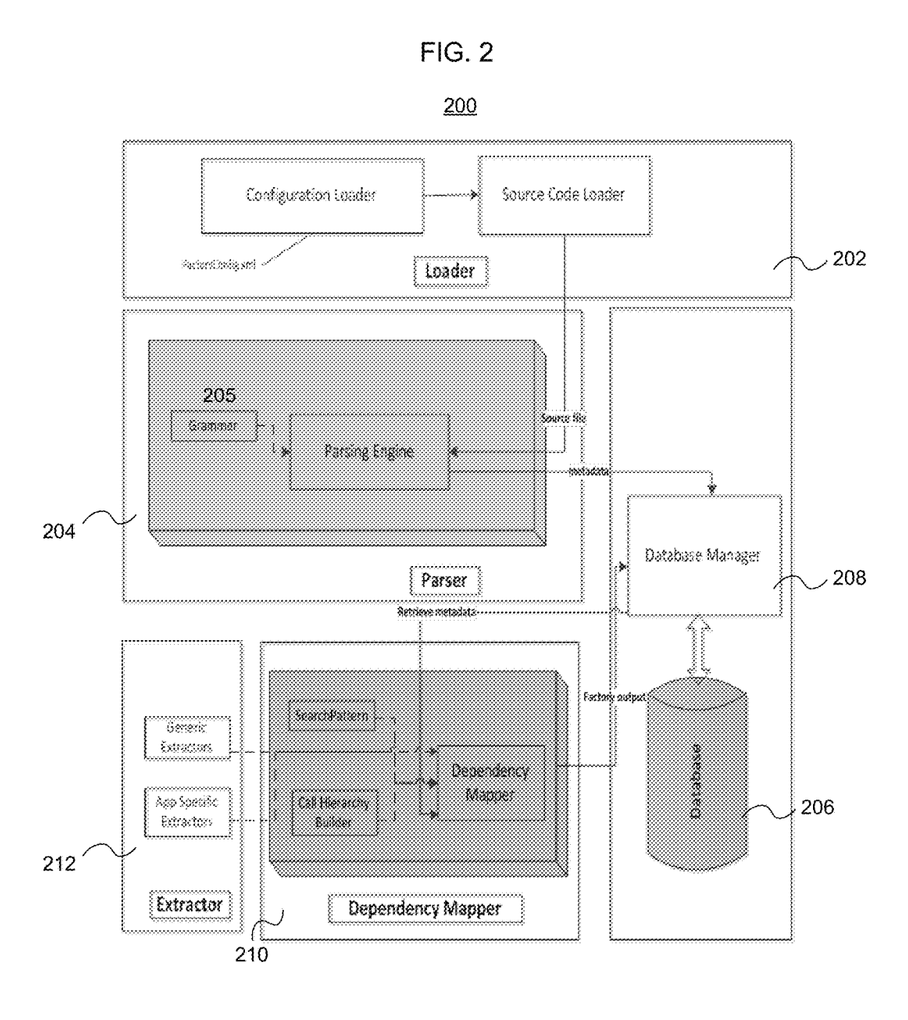
FIG. 2 illustrates a diagram of the architecture for an automated cross-application dependency mapping system in accordance with one or more aspects of the disclosure.

FIG. 2 illustrates one embodiment of an architecture 200 for automated cross-application dependency mapping. The architecture 200 shown in FIG. 2 includes a loader 202, a parser 204, a database 206, including a database manager 208, a dependency mapper 210, and an extractor 212.

One example of the operation of the system architecture shown in FIG. 2 is as follows. A user specifies a desired configuration file (or files) through an input/output device, such as a graphical user interface (not shown) via, for example, network computer 110 of network 140 as shown in FIG. 1, and the specified configuration file (or files) is loaded by the configuration loader of loader 202. By way of example, the desired configuration file may be a "Factory-Config.xml" file, as illustrated in FIG. 2.

The project base path may be analyzed in order to identify source files to be parsed that are relevant to the loaded configuration. The source code loader of loader 202 loads the file paths of the relevant source files into the parsing queue (e.g., "parsing engine" illustrated in FIG. 2) of the parser 204. Parsing "Grammer" 205 (or otherwise known as parsing grammar) shown in FIG. 2 may be provided to the parsing queue. The parsing grammer 205 may include various rules associated with the symbols, grammatical structure of linear text input, etc. from the relevant source files in order to carry out parsing by the parser 204. The parsing technique implemented by the parser 204 may be, for instance, bottom-up parsing.

Once the file paths of the relevant source files are loaded into the parsing queue, the configured threads are started by the parser 204. Each configured thread will pick a source file corresponding to a file path stored in the parsing queue and parse the source file and extract the information from the source file relevant to the loaded configuration and add the extracted information into the database manager 208, which may include a DataPersist queue (not shown). For example, the extracted information may be known as "metadata," as shown in FIG. 2. A dedicated queue will poll the parsed information added to the DataPersist queue and will update the database 206 accordingly. The database manager 208 and/or database 206 may be stored, for example, in storage device 130 of network 140, as illustrated in FIG. 1. Both the parsing of the relevant source files and processing of the extracted information that is put into the DataPersist queue may occur in parallel. As will be further discussed below, the diagram of FIG. 3, for example, illustrates an exemplary process for parsing the relevant source files and processing the extracted information.

Figure 4:
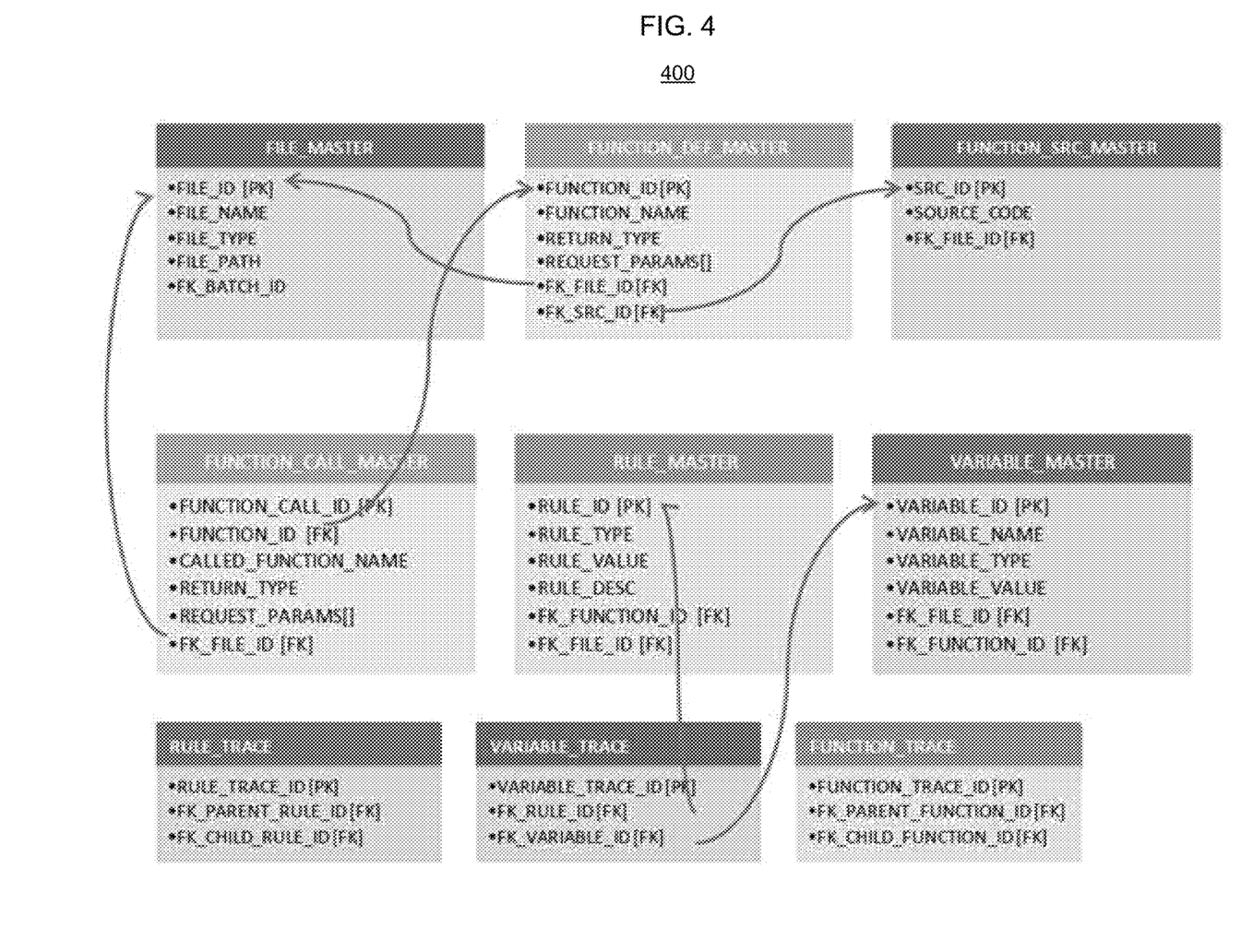
FIG. 4 depicts a diagram of the database of the architecture of FIG. 2 in accordance with one or more aspects of the disclosure.

After the parser completes parsing of all of the relevant source files, a dependency manager within the dependency mapper 210 will begin to analyze the call hierarchy of each of the service operations or tasks related to information extracted from the relevant source files. The service operations or tasks are loaded into a dependency queue of the dependency mapper 210 by the parser. For each service operation or task loaded into the dependency queue, the following dependency threads may be performed in parallel: (1) a service operation or task is selected from the dependency queue; (2) the call hierarchy and type of the call associated with the particular service operation or task is identified, and the corresponding transaction is obtained with assistance from a transaction extractor, either a generic or application specific extractor, as shown in the extractor 212 of FIG. 2; and/or (3) the complete call hierarchy report for the particular service operation or task is written to the database 206 via the database manager 208, an example of which is shown in the diagram of FIG. 4. Moreover, as illustrated in FIG. 2, a search pattern and/or call hierarchy builder may be connected to the dependency mapper and may be used to generate the call hierarchy reports.

A final report is generated that includes complete details of the particular service operation or task and corresponding transactions, including all the call hierarchy of each of the operations or tasks. The final report may be accessed by the user through the input/output device, such as a graphical user interface of the network computer 110 and/or the server computer 120 of network 140, as illustrated in FIG. 1. By way of example, the final report may be used, or may be further depended on by other network computers, to maintain, modify, and/or enhance the various applications (and the above-described source files) that are associated with the enterprise IT environment. For instance, the final report may be used to generate service reports for particular end users, customers, and/or consumers, which may be a series of reports on the various call hierarchies associated with their respective enterprise IT environments. These service reports may provide detailed analysis of the call hierarchies and the overall impact and/or implications on their IT system(s). In one example, a service report may be in digital format and may be utilized on one or more GUIs by the end user, customers, and/or consumers.

As described above, FIG. 3 illustrates a flow diagram 300 of an algorithm for parsing source files and processing the extracted information therefrom in accordance with one or more aspects of the disclosure. As shown, the parsing algorithm begins by reading source path and batch information through command line. The algorithm may then loop through the files and folders associated with the specified configuration file (or files) loaded by the loader 202 and subsequently determine whether the files are valid. If the files are not valid, the files and folders are looped through again. If the files are valid, the algorithm commences the parsing process by lopping through each line in the file.

Figure 3:
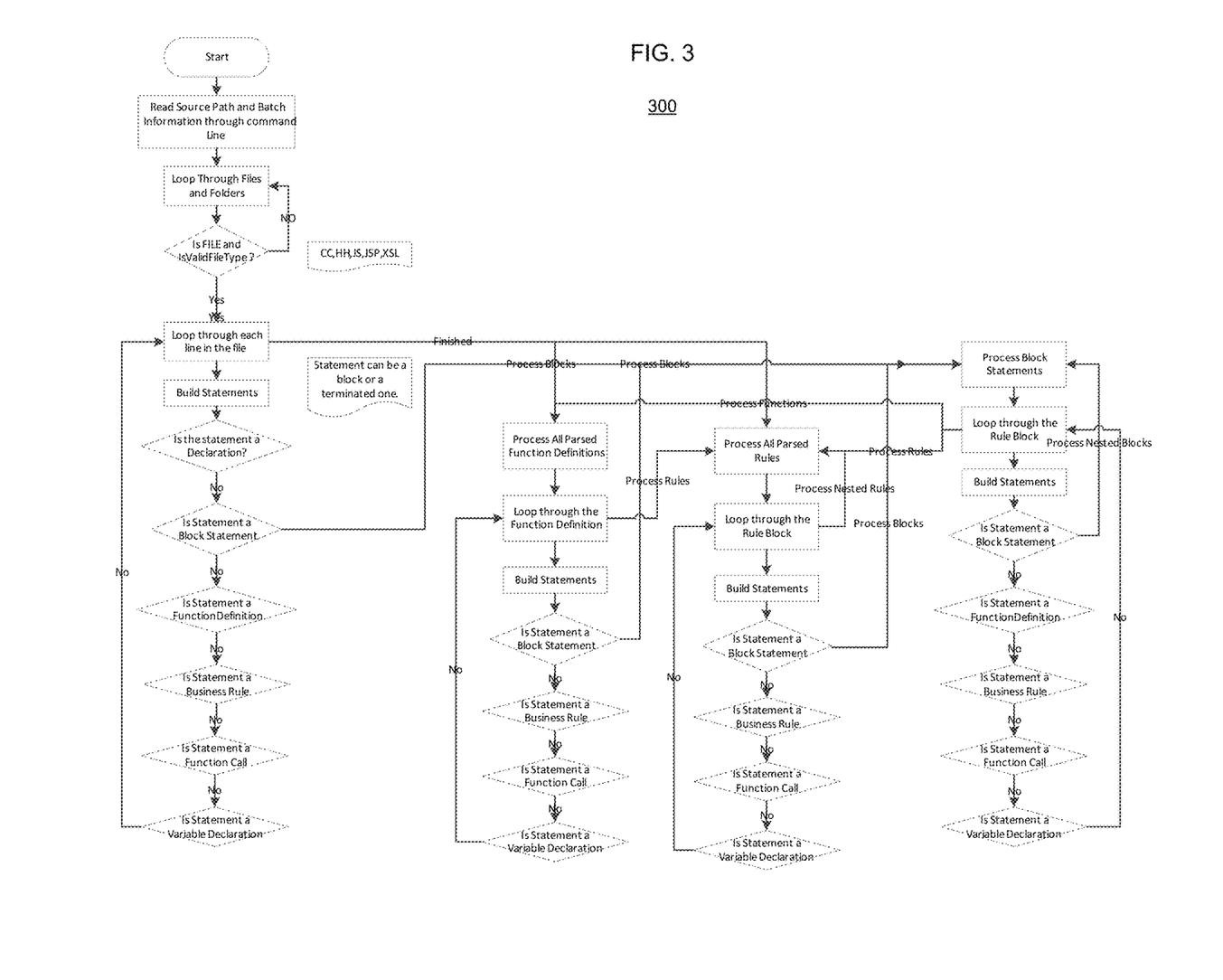
FIG. 3 illustrates a flow diagram of an algorithm used by the architecture of FIG. 2 in accordance with one or more aspects of the disclosure.

As shown in the left-most column of the flow diagram 300, statements can be built from the parsed information. For example, the statements may be a block or be a terminated one. Once the statements are built, the algorithm performs further processing on the statements. For example, it is determined whether the statement is a declaration; whether the statement is a block statement; whether the statement is a function definition; whether the statement is a business rule; whether the statement is a function call; and whether the statement is a variable declaration.

When it is determined that a statement is a block statement, the algorithm performs further processing on the block statements in order to loop through the rule block and subsequently build statements. The block statement processing is illustrated by the right-most column of the flow diagram 300. The statements, for example, are then further processed by, e.g., determining whether the statement is a block statement, determining whether the statement is a function definition, determining whether the statement is a business rule, determining whether the statement is a function call, and determining whether the statement is a variable declaration.

The middle columns of the flow diagram 300 illustrate the processing steps of all the parsed function definitions and all the parsed rules. After each line in the file is looped through at the beginning of the algorithm, as described above, all the parsed function definitions are processed by looping through the function definition as shown. In parallel, all the parsed rules may also processed by looping through the rule book. Once statements are built in each of the processing columns, the statements are again further processed by, e.g., determining whether the statement is a block statement, determining whether the statement is a business rule, determining whether the statement is a function call, and determining whether the statement is a variable declaration. At any point the built statements in the two middle processing columns are determined to be a block statement, the block statements are processed according to the processing procedure in accordance with the right-most processing column of the flow diagram 300, as described above.

The information generated from the flow diagram 300 of FIG. 3 may be used by a dependency mapper, e.g., dependency mapper 210 of FIG. 2, to complete a call hierarchy report for the particular service operation or task. The database manager 208, for instance, polls the extracted parsing information and updates the data in the connected database 206. FIG. 4 illustrates a call hierarchy report 400 in accordance with one or more aspects of the disclosure.

As shown in FIG. 4, for example, the call hierarchy report 400 includes at the topmost row a "File_Master" box, a "Function_Def_Master" box, and a "Function_SRC_Master" box, each of which includes various types of information. For example, the File_Master box includes a "File_ID [PK]," a "File Name," a "File Type," "File Path," and "FK_Batch_ID." The middle row of the call hierarchy report 400 includes a "Function_Call_Master" box, a "Rule_Master" box, and a "Variable_Master" box, each of which again contains various types of information. The bottom row includes a "Rule_Trace" box, a "Variable_Trace" box, and a "Function_Trace" box.

The arrows depicted in FIG. 4 illustrate the call hierarchy for the information in each of the boxes. By way of example, the "FK_File_ID [FK]" associated with the "Function_Call_Master" box is hierarchically related to the "File_ID [PK" associated with the "File_Master" box. Likewise, the "FK_File_ID [FK]" associated with the "Function_Def_Master" box is also hierarchically related to the "File_ID [PK" associated with the "File_Master" box.

In accordance with foregoing embodiments, examples, and/or aspects of the invention, source code of all source files relevant to a desired configuration are automatically parsed and all dependencies between functions and transactions across application boundaries are identified. For any function or transaction, it is possible to identify all relevant callers across application boundaries at any point in time. End-to-end traceability of functions, transactions, or services across application boundaries is provided. A call trace may be viewed by starting at any level of the call hierarchy, and the callers can be traced to the source application that invokes the relevant function, transaction, or service. The embodiments of the invention provide the ability to search all callers of a particular function, transaction, or service across application tiers, and callers may be searched by starting at the application boundary level. In addition, potential orphans and duplicates can be identified at any point, with the call hierarchy function usable to identify duplicates.

In a further aspect of the disclosure, an easy-to-use, intuitive GUI is provided that includes a dashboard that permits a user to view end-to-end traceability of relevant functions, transactions, or services. Links may be provided within the GUI that can be clicked by a user in order to navigate directly to the relevant code from a given use case, test case, or business rule, and vice versa.

While certain exemplary embodiments have been described and shown in the accompanying drawings, it is to be understood that such embodiments are merely illustrative of and not restrictive on the broad inventions, and that this inventions not be limited to the specific constructions and arrangements shown and described, since various other modifications may occur to those ordinarily skilled in the art.

What is claimed is:

1. A system for automating cross-application dependency mapping of an information technology (IT) environment, the system comprising:
   at least on computing device; and
   a non-transitory computer readable medium storing executable instructions, the executable instructions when executed by at least one computing device causes the at least one computing device to:
      receive a source file associated with at least one configuration file of the legacy IT environment, wherein the source files include source code corresponding to the plurality of different software applications having different programming languages;
      parse the source code in order to obtain parsed information, wherein parsing the source code includes:
         placing file paths of the source files into a parsing queue,
         starting a plurality of configured threads,
         selecting, by each configured thread, a respective source file corresponding to a file path stored in the parsing queue, and
         looping, for each configured thread, through each respective line in the selected source file associated with the respective configuration thread, in order to obtain the parsed information, wherein the parsed information characterizes the source code execution dependencies for function, transaction and service calls of service operations of each of the software applications across application boundaries;
      analyze the parsed information to identify the execution dependencies of each of the service operations between the software applications and generate a call hierarchy therefrom.

2. The system of claim 1, wherein the executable instructions further cause the at least one computing device to identify the source file contained in the IT environment in response to the at least one configuration file specified by the user.

3. The system of claim 2, wherein the at least one configuration file is specified by the user via a graphical user interface (GUI) of the computing device.

4. The system of claim 1, wherein the executable instructions further cause the at least one computing device to perform additional processing on the parsed source file.

5. The system of claim 4, wherein the additional processing includes:
   building one or more first statements; and
   determining whether the one or more first statements is: (i) a declaration, (ii) a block statement, (iii) a function definition, (iv) a business rule, (v) a function call, or (vi) a variable declaration.

6. The system of claim 5, wherein the one or more first statements, when determined to be a block statement, is further processed by:
   looping through a rule block;
   building one or more second statements; and
   determining whether the one or more second statements is: (i) a block statement, (ii) a function definition, (iii) a business rule, (iv) a function call, or (v) a variable declaration.

7. The system of claim 4, wherein the additional processing includes:
   processing all parsed function definitions;
   looping through each parsed function definition;
   building one or more third statements; and
   determining whether the one or more third statements is: (i) a block statement, (ii) a business rule, (iii) a function call, or (iv) a variable declaration.

8. The system of claim 4, wherein the additional processing includes:
   processing all parsed rules;
   looping through a rule block for each parsed rule;
   building one or more fourth statements and
   determining whether the one or more fourth statements is: (i) a block statement, (ii) a business rule, (iii) a function call, or (iv) a variable declaration.

9. The system of claim 1, wherein the parsed information is stored in one or more databases.

10. The system of claim 9, wherein the database is managed by a database managing application, the database managing application configured to receive the parsed information and further configured to provide the parsed information for the analysis to identify the execution dependencies.

11. The system of claim 9, wherein the executable instructions further cause the at least one computing device to:
   generate a call hierarchy report from the call hierarchy; and
   store the call hierarchy report in the one or more databases.

12. The system of claim 1, wherein the source file associated with the at least one configuration file is identified by a loading application.

13. The system of claim 1, wherein the executable instructions further cause the at least one computing device to:
   analyze the call hierarchy via a dependency mapping application.

14. The system of claim 13, wherein the analysis of the call hierarchy is based at least in part on one or more of: (i) a search pattern, (ii) a call hierarchy builder; (iii) one or more generic extractors, and (iv) one or more application specific extractors.

15. The system of claim 14, wherein the one or more generic extractors and the one or more application specific extractors are provided by an extracting application.

16. The system of claim 1, wherein the source file is parsed by a parsing application.

17. The system of claim 1, further comprising:
   at least one server computing device; and
   at least one storage device,
   wherein one or more of: the at least one computing device, the at least one server computing device, and the at least one storage device, is in direct communication with the IT environment or in communication with the IT environment via one or more networks.

18. A computer-implemented method for automating cross-application dependency mapping of an information technology (IT) environment, the method comprising:
receiving a source file associated with at least one configuration file of the legacy IT environment, wherein the source files include source code corresponding to the plurality of different software applications having different programming languages;
parsing the source code in order to obtain parsed information, wherein parsing the source code includes:
placing file paths of the source files into a parsing queue,
starting a plurality of configured threads,
selecting, by each configured thread, a respective source file corresponding to a file path stored in the parsing queue, and
looping, for each configured thread, through each respective line in the selected source file associated with the respective configuration thread, in order to the obtain parsed information, wherein the parsed information characterizes the source code execution dependencies for function, transaction and service calls of service operations of each of the software applications across application boundaries;
analyzing the parsed information to identify the execution dependencies of each of the service operations between the software applications and generate a call hierarchy therefrom.

19. A non-transitory computer readable medium storing executable instructions, the executable instructions when executed by at least one computing device causes the at least one computing device to perform a method for automating cross-application dependency mapping of an information technology (IT) environment, the method comprising:
receiving a source file associated with at least one configuration file of the legacy IT environment, wherein the source files include source code corresponding to the plurality of different software applications having different programming languages;
parsing the source code in order to obtain parsed information, wherein parsing the source code includes:
placing file paths of the source files into a parsing queue,
starting a plurality of configured threads,
selecting, by each configured thread, a respective source file corresponding to a file path stored in the parsing queue, and
looping, for each configured thread, through each respective line in the selected source file associated with the respective configuration thread, in order to obtain the parsed information, wherein the parsed information characterizes the source code execution dependencies for function, transaction and service calls of service operations of each of the software applications across application boundaries;
analyzing the parsed information to identify the execution dependencies of each of the service operations between the software applications and generate a call hierarchy therefrom.

* * * * *